United States Patent [19]

Green et al.

[11] Patent Number: 6,111,888
[45] Date of Patent: Aug. 29, 2000

[54] DETERMINISTIC SERIAL BUS COMMUNICATION SYSTEM

[75] Inventors: Thomas C. Green, Boulder; Paul J. Hays, Louisville; Allan L. Samson, Berthoud; Jeffrey S. Walker, Louisville; Michael J. Zolock, Longmont, all of Colo.

[73] Assignee: Micro Motion, Inc., Boulder, Colo.

[21] Appl. No.: 08/863,531

[22] Filed: May 27, 1997

[51] Int. Cl.[7] ................................................. H04L 12/43
[52] U.S. Cl. ........................ 370/461; 370/447; 370/462; 370/509
[58] Field of Search ................................ 370/445, 447, 370/449, 450, 451, 455, 457, 458, 461, 498, 503, 509, 520, 462

[56] References Cited

U.S. PATENT DOCUMENTS

| | | | |
|---|---|---|---|
| 5,289,466 | 2/1994 | Nobutoki et al. | 370/461 |
| 5,323,385 | 6/1994 | Jurewicz et al. | |
| 5,392,280 | 2/1995 | Zheng | |
| 5,469,150 | 11/1995 | Sitte | |
| 5,479,395 | 12/1995 | Goodman et al. | 370/438 |
| 5,574,848 | 11/1996 | Thomson | 395/181 |
| 5,600,782 | 2/1997 | Thomson | 395/182.02 |
| 5,784,547 | 7/1998 | Dittmar et al. | 395/182.02 |
| 5,802,061 | 9/1998 | Agarwal | 370/461 |

FOREIGN PATENT DOCUMENTS 44 08 488 A1   9/1995   Germany .

OTHER PUBLICATIONS

J. D. Decotignie et al., "Producer–Distributor–Consumer Model on Controller Area Network," 20th IFAC/IFIP Workship on Real–Time Programming, IFAC Real Time Programming (Fort Lauderdale, Florida, US), p. 35–42, Nov. 1995.

*Primary Examiner*—Ajit Patel
*Assistant Examiner*—Bob A. Phunkulh
*Attorney, Agent, or Firm*—Duft, Graziano & Forest, P.C.

[57] ABSTRACT

An apparatus and method for deterministically communicating data between multiple nodes in a fashion that is consistent with the Controller Area Network ("CAN") communications protocol. The system applies to multiple nodes that functional blocks within an operating system environment and to multiple nodes that are each connected to a serial bus. The system utilizes standard CAN error checking, bus arbitration and message formatting and therefore uses standard CAN controllers and transceivers. One node on the bus is selected as the master node. The master node issues a periodic synchronization signal which defines time divisions within which the operations of each node and communications over the CAN bus are organized. Data, particularly real-time data, is transmitted between nodes on the CAN bus during a known time division. Standard CAN bus arbitration is used to ensure that real-time data is transmitted over the CAN bus prior to the transmission of non-real-time data. This ensures that real-time data is, if appropriate, transmitted during each time division.

23 Claims, 5 Drawing Sheets

DETERMINISTIC SERIAL BUS COMMUNICATION SYSTEM

FIELD OF THE INVENTION

The present invention generally relates to the field of serial bus communication systems. Specifically, the present invention relates to the field of serial bus communication systems using the Controller Area Network ("CAN") protocol and in particular to a method for adapting the CAN protocol to provide deterministic communication of real time data between nodes on a communication bus and between functional blocks within a node.

STATEMENT OF THE PROBLEM

Data bus communication systems are used in countless applications. The control and manipulation of industrial processes, commonly referred to as the process control industry, is exemplary of applications where the transmission of data between multiple nodes is required. The process control industry requires the communication of data between multiple sensors, e.g. flowmeters, and multiple control elements, e.g. valves. Sensors and controls elements are referred to herein collectively as instruments or instrumentation. Continuous processes are typically monitored and controlled by measuring certain characteristics of a material being processed, inferring a state or condition of the process from the measured characteristics, and generating control signals which operate to control devices such as pumps, conveyer belts and valves to keep the process within a specified range of operation. The quality of a finished product, as well as the safety of the process plant, is determined by the extent to which a process is properly controlled.

Some instrumentation in a process control plant produces data which is transmitted to a central control system. The control system processes the data from the various instruments and transmits control signals to control elements. A control element might be a valve, for example, which is opened and closed in response to a control signal produced by the control system. All of the instrumentation and control systems in a given process plant are interconnected over some type of communications bus to allow the necessary processing of the measurement data and transmission of the control signals.

There are different types of data communicated over data busses. "Non-real-time" data is data that is not rendered less valuable if the data is not received as of a certain deadline. An example of non-real-time data is a request from a central control system to a pressure transmitter requesting the serial number of the pressure transmitter. Proper control of the system is not dependant on knowing with certainty the time at which the request was generated. "Real-time" data has a specific deadline by which the data must be received or the data is lost or rendered useless. An example of real-time data is a mass flow rate signal transmitted from a mass flow instrument to a control system. The control system might, for example, use the mass flow rate signal to generate a control signal to a valve to maintain the mass flow rate through the system to within 0.5% of a target value. In this case it is important that a continuous and predictable stream of mass flow data be delivered to the control system and from the control system to the control valve.

Since the current status of a process, as measured by its respective instrumentation, is processed and fed back to adjust the process itself, the real-time nature of the process instrumentation data must be maintained. For this reason, among others, each piece of instrumentation in a system is typically separately connected to the control system and provides real-time data indicative of its respective measurement to the control system. The control system then provides the necessary timing and coordination to process multiple signals from multiple instrumentation sensors to produce the necessary control signals. In some systems, each piece of instrumentation is provided a dedicated, hard-wired connection to the control system. This ensures that the data from each piece of instrumentation will be communicated to the control system in a way that preserves the real-time nature of the data. However, this system also requires a complex and costly process plant wiring system in order to connect sometimes thousands of instruments to a control system.

It is sometimes the case that a single piece of instrumentation generates multiple data signals for purposes of local control or transmission to a control system. For example, a Coriolis mass flowmeter might be used to measure the amount of fluid flowing into a tank. After a predetermined mass of the fluid has flowed into the tank, a valve is to turn off thereby stopping the flow of fluid into the tank. The data necessary to determine when the predetermined mass has been reached includes the mass flow rate of the fluid and the total mass of the fluid flowed into the tank. Both of these values are provided by a Coriolis mass flowmeter. Rather than communicating a mass flow rate value and a total mass value from the Coriolis mass flowmeter to a control system for development of the valve control signal, it is desirable to process the mass flow rate and total mass data and produce the valve control signal locally in the Coriolis mass flowmeter. In addition to the mass data, there are various non-real-time data signals processed within a Coriolis flowmeter. These signals include, but are not limited to, changes to the configuration data and tag information. These non-real-time signals are of a lower priority than the real-time signals because a delay in processing them does not degrade the accuracy or performance of the flowmeter or the tank batching control. A data bus is sometimes necessary to coordinate the transmission of the various real-time and non-real-time data signals within a single instrument.

Whether one considers an enterprise-wide communication bus across a process plant or an intra-instrument bus within a single instrument computer, there are two primary types of communication protocols from which to choose. In Carrier-Sense Multiple Access ("CSMA") protocols, each node on the bus senses traffic and waits for traffic to clear before sending a message. When two nodes try to send messages at the same time, both nodes step back and try to transmit again at a later time. Another category of communication protocols is known by the heading Time Division Multiple Access ("TDMA"). In TDMA-type protocols, each node on the bus is allotted a slot of time in which to transmit and receive messages. TDMA protocols typically are, among other things, deterministic. A deterministic communications protocol is one which provides ensured schedulability of the actions in a real-time system.

The Controller Area Network ("CAN") protocol is one protocol in the group of protocols known generally under the heading of CSMA. The CAN protocol has been adopted by the automotive industry as one of the standards for internal, operational data communications for automobiles. Typically, multiple sensors are located throughout the vehicle at various locations. A two-wire serial bus is used to provide the communications between the multiple sensors and the microprocessor(s). For example, there may be sensors necessary for engine management in the engine bay and sensors necessary for anti-lock brakes at or near each wheel. Output from these sensors is communicated over the two-wire bus to microprocessor(s) for use in determining the proper control of the vehicle. CAN provides, among other features, a means for arbitrating between the various sensors to avoid conflicts between their respective signals. The arbitration includes a way to prioritize the signals so that more important signals are processed before less important signals. This allows the microprocessor to process a "brakes applied" signal before an "air-conditioning on" signal when both signals are initiated at the same time. CAN also provides a defined message format and an error checking scheme for confirming the soundness of the communicated messages. CAN does not, however, provide a means to ensure that messages of a certain type or class, such as real-time messages, are communicated on a regular, deterministic basis.

Due to the adoption of the CAN protocol by the automotive industry, microprocessors and peripherals specifically designed for implementing CAN-based systems are readily available. Their wide use and relative low cost makes these CAN processors an attractive choice for designers of communication buses.

There exists a need for a communication bus which provides the advantages of CSMA communication protocols such as arbitration, error checking and defined message formats as well as the determinism provided by TDMA-like communication protocols. In particular, there exists a need for a deterministic CAN-based protocol which allows the designer to utilize the relatively inexpensive advantages of the CAN protocol and readily available hardware in a deterministic communications environment.

STATEMENT OF THE SOLUTION

The above identified problems, and others, are solved and a technical advance is achieved in the field by the deterministic serial bus communication system of the present invention. The present invention provides a method and apparatus by which standard CAN processors and related hardware are used in a real-time, deterministic processing system. The advantages of the CAN protocol including inexpensive processors, message collision resolution, error handling and message definition are combined with a time synchronization approach which provides ensured schedulability of the actions in a real-time system.

Generally, the present invention utilizes a synchronization signal transmitted over a serial bus to multiple nodes. The synchronization signal defines the start of a time division for each of the nodes that are connected to the bus system. In one embodiment of the present invention, each node represents one or more sensors attached to a bus. For example, each piece of instrumentation in a chemical processing plant might be a node on the serial bus. In another embodiment of the present invention, each node represents one or more processing modules. For example, a Coriolis flowmeter transmitter contains a mass flow processing module at one node and a density processing module at a second node. Both nodes are connected to the bus. In a third embodiment of the present invention, a node may contain multiple function blocks. For example, a Coriolis flowmeter transmitter contains a node which produces a batch control signal. The batch node contains one function block that determines the totalized mass flow and a second function block that produces the batch control signal in response to the totalized mass flow amount. The intra-nodal communication of data between the function blocks within a node are conducted so as to be easily coordinated with the CAN protocol of the present invention. The CAN protocol of the present invention represents a hybrid of the standard CAN protocol with the determinism of TDMA-based protocols. The communications protocol of the present invention is referred to herein as CAN with Determinism ("CAN-D").

In an embodiment of the present invention, each time division is comprised of three periods. During a first segment or period of the time division, a synchronization signal ("sync signal") notifies all the nodes on the bus of the start of a new time division. Also during this period, each of the nodes on the bus generating real-time data queues up the appropriate data for transmission. During a second segment or period of the time division, each of the nodes generating real-time data transmits that data to the bus. During a third segment or period of the time division, any node can request and transmit non-real-time data over the bus. The result is that the real-time data is schedulably transmitted to the bus during every time division. This ensured schedulability, or determinism, of the present invention means that real-time data, used to control continuous, real-time processes, is transmitted at known, regular intervals over the bus.

In a further embodiment of the present invention, each sync signal initiates the next time division and concludes the previous time division. Messages from nodes producing real-time data are given higher priority than messages from nodes producing non-real-time data. Standard CAN collision resolution operates to arbitrate message traffic over the bus. The length of the time divisions and the number of nodes on the bus are selected such that every real-time node can transmit a message during every time division. If there is not enough time remaining during a time division after transmission of the real-time messages, then non-real-time messages are held over for transmission during the next time division.

In a further embodiment of the present invention, each synchronization signal initiates the next time division and concludes the previous time division. A software router at each node directs the generation of messages for that node during the current time division. The messages at each node are generated in response to the directions from each node's respective software router. Real-time messages are queued during one time division for transmission at the start of the next time division. Non-real time messages are transmitted when time allows during the current time division. With the next synchronization signal, the next time division begins. The queued real-time messages transmit at the start of the time division. After which the node software routers direct the next set of messages to be generated.

During each time division, the message arbitration, error checking and message formatting is conducted according to the CAN protocol. The end of one time division and the start of the next time division is determined by the synchronization signal. If the bus is idle, meaning no messages are being transmitted, at the time the synchronization signal is initiated, then the next time division begins when the synchronization signal is initiated. If a multi-part message is being transmitted over the bus at the time a synchronization signal is initiated, the synchronization signal may "cutoff" one or more CAN packets because of the higher priority of the synchronization signal. Any signal cutoff or terminated because of the start of a new time division is transmitted in subsequent time divisions until it is successfully transmits in its entirety over the bus.

The present invention allows an instrumentation or plant designer to use the proven and inexpensive CAN protocol and CAN processors and to do so for the processing of real-time data using a deterministic serial communications bus. The present invention also allows the modular design of instrumentation using standard CAN processors. The various processing modules of an instrument according to the present invention utilize the CAN-D protocol to communicate among one another. The present invention is also used to control intra-node communications between functional blocks within a node.

DETAILED DESCRIPTION

Figure 1:
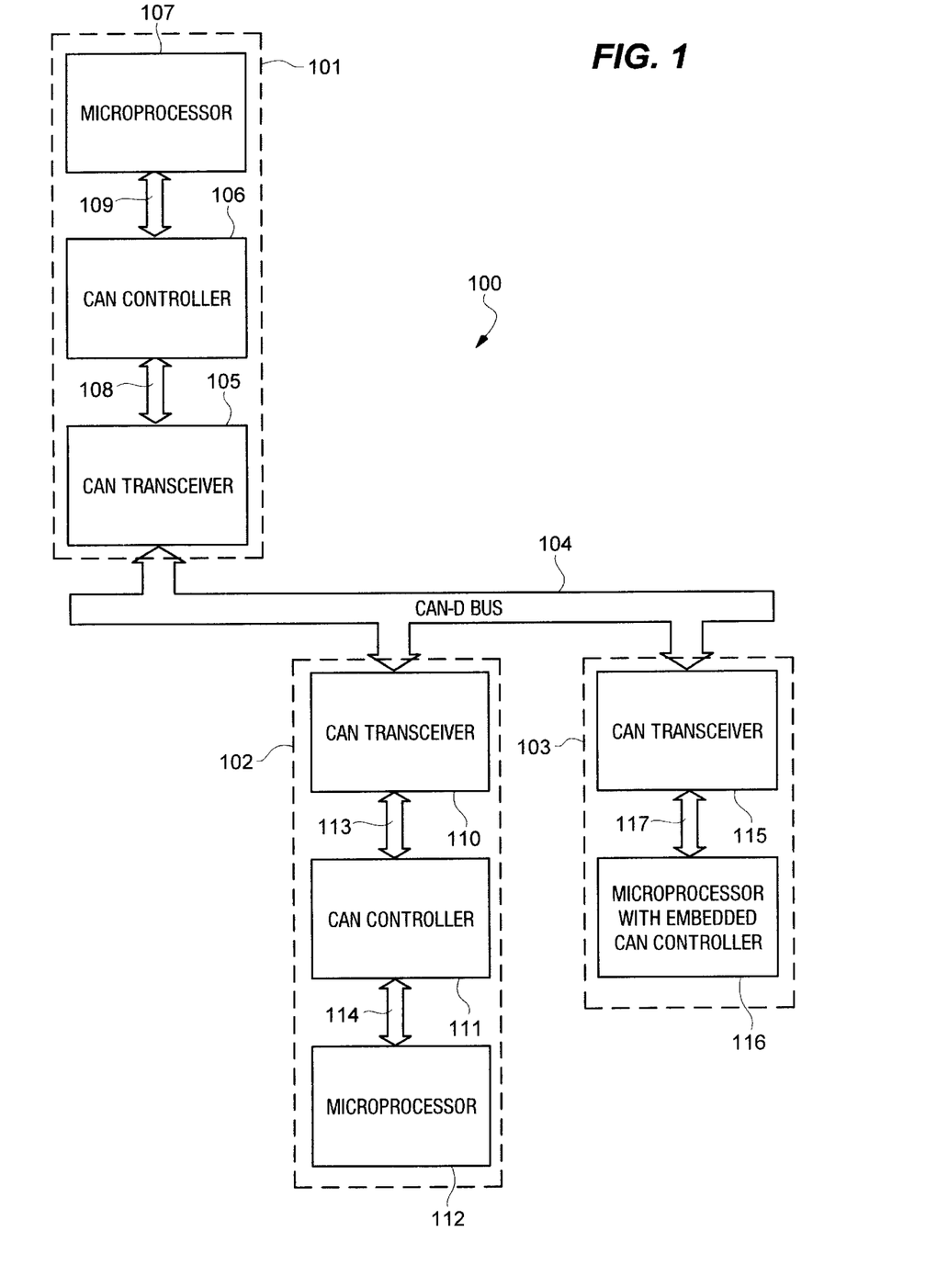
FIG. 1 is a block diagram of a communications bus implementing the CAN protocol.

Controller Area Network (CAN) Protocol and Network—FIG. 1

FIG. 1 illustrates a network 100 including nodes 101–103. Each of nodes 101–103 is connected to two-wire bus 104. FIG. 1 shows only a section of bus 104 which extends in both directions.

Network 100 is typical of the networks of nodes in which the CAN protocol is utilized. An exemplary application is in the automotive industry where node 101 is an engine management control device, node 102 is a anti-lock brake sensor and node 103 is an anti-lock brake control device. Each node contains a CAN controller which is either embedded in a microprocessor or is a stand-alone controller. An example of a microprocessor with an available embedded CAN controller is the Motorola MC68HC05 microprocessor. An example of a stand-alone CAN controller is the Siemens 81C90/91—Stand Alone Full CAN Controller. The CAN controller is responsible for implementing the rules of the CAN protocol, discussed in more detail below. Each node also contains a CAN transceiver which controls the physical interface between a node and the CAN bus. The most common physical interface, and the one used in the preferred embodiment of the present invention, is based on ISO 11898; "Road Vehicles—Interchange of digital information—Controller Area Network (CAN) for high speed communications." An example of a CAN transceiver chip that is compatible with the ISO 11898 standard is the Phillips 82C250 CAN transceiver.

Node 101 includes CAN transceiver 105. CAN transceiver 105 communicates over intra-node path 108 with CAN controller 106. CAN controller communicates over intra-node path 109 with microprocessor 107. Each time microprocessor 107 sends a message over bus 104, the message is actually sent from microprocessor 107 to CAN controller 106. CAN controller 106 is responsible for performing error checking, bus arbitration and message transmission all according to the CAN protocol. CAN controller 106 is physically connected to bus 104 through CAN transceiver 105. Likewise, node 102 includes CAN transceiver 110. CAN transceiver 110 communicates over intra-node path 113 with CAN controller 111. CAN controller communicates over intra-node path 114 with microprocessor 112. Node 103 includes similar functionality to nodes 101–102 but a different hardware configuration. The CAN controller is embedded in microprocessor 116. Communications between microprocessor 116 and CAN transceiver 115 occur over intra-node path 117.

Applying the anti-lock brake system example to network 100, a sensor (not shown) inputs the wheel speed to microprocessor 112 of node 102. Node 102 operates to transmit a message over bus 104 to node 101 which includes a measure of the wheel speed sensed by node 101. Microprocessor 107 of node 101 calculates the appropriate actions in response to the message from node 102. Node 101 operates to communicate over bus 104 to node 103 a message directing the application of the brakes at the wheel controlled by node 103. Microprocessor 116 of node 103 outputs a signal to a brake control (not shown) to apply the brakes. All messages over bus 104 occur according to the CAN protocol.

CAN controllers 106, 111 and 116 coordinate the transmission of messages over bus 104. The CAN controllers implement the CAN message formatting, error checking and message arbitration of the CAN protocol. Each message transmitted over bus 104 conforms to the CAN message format, described below. Message arbitration is necessary since multiple nodes are connected to bus 104. CAN provides an arbitration system that allows the prioritization of messages from different nodes. For example, if node 102, the anti-lock brake sensor device, attempts to transmit a message over bus 104 at the same time that an engine management node (not shown) attempts to transmit a message over bus 104, the CAN protocol automatically determines which node gets to "talk" first over bus 104. In this example, anti-lock brake-related messages from node 102 might be deemed more important than engine management control-related messages and therefore messages from node 102 are given a higher priority under the CAN protocol.

The CAN protocol (Version 1.2) utilizes an eleven bit identifier field in each message as a priority code to identify a particular device connected to bus 104. The identifier field is similar to a header and is followed by data fields. As is understood by those skilled in the art, the eleven bit identifier field of the CAN protocol can be used to identify a particular device in the system or, alternatively, can be used to identify a particular message. All messages are prioritized with a message having the highest priority being assigned an identifier field having the smallest digital value. The next to the highest priority message is assigned the next to the smallest digital value, etc., down to the message having the lowest priority, which is assigned the largest digital value. Transmit logic of each node 101–103 makes a bit by bit comparison between the message it is transmitting and the bus logic level. When two nodes happen to transmit on bus 104 simultaneously the node having the lower priority will have a recessive bit, e.g., a logic one, earlier in the message identifier, which will be over-written by a dominant bit, e.g., a logic zero, of the higher priority message. Upon detecting this, the node transmitting the lower priority message will stop transmitting and become a "listener". This is the basic concept of CAN priority arbitration. Every node is assigned a different priority (or prioritized) by virtue of its node address(es). The priority of each message is determined by the values set in the identifier field. The identifier field is the first field of every message sent by a node. The CAN identifier field and CAN arbitration in general is well known to those skilled in the art. The CAN protocol itself was defined by Robert Bosch GmbH as "CAN Specification Version 1.2".

A standard component of CAN controllers and the CAN protocol is an error checking function. CAN error checking is typically done by the CAN controller and is a 16 bit, Cyclic Redundancy Check (CRC) checksum test.

Existing CAN systems are quite flexible and efficient to implement in part due to the formatting, error checking and message arbitration described above. However, as noted, existing CAN systems offer no mechanism for ensuring that certain events or messages occur during a certain time period. If one is measuring, for example, the mass flow rate of a fluid through a pipe in grams per second, one must have certain information on a periodic basis in order to produce an accurate measurement. Existing CAN systems cannot guarantee that certain information will be transmitted over the bus on a periodic basis. i.e., existing CAN systems are not deterministic. Existing CAN systems can only guarantee that a message of higher priority will be transmitted over the bus before a message of lower priority.

Figure 2:
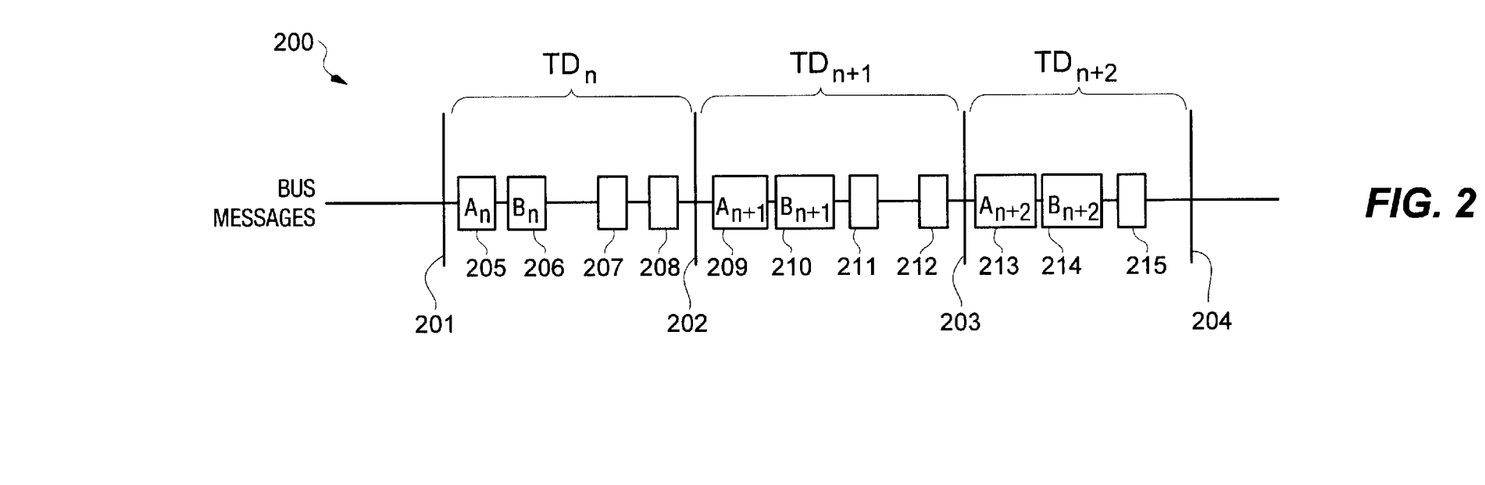
FIG. 2 is a timeline illustrating bus message activity in a communications system according to the present invention.

CAN with Determinism—In General—FIG. 2

FIG. 2 includes timing diagram 200 illustrating, in general, the operation of the present invention. FIG. 1 is also referred to with respect to the present invention since the basic hardware arrangement with respect to bus 104 is the same for networks according to the present invention as for networks according to existing CAN systems. The communications system of the present invention is referred to herein as CAN with Determinism ("CAN-D"). Timeline 200 represents message activity over bus 104 during a sequence of time. A CAN-D communications system imposes a system time by transmitting sync pulses 201–204 to produce equal, periodic time divisions $TD_n$, $TD_{n+1}$ and $TD_{n+2}$. Sync pulses 201–204 are themselves CAN messages having high priority. Timeline 200 illustrates only several time divisions. One skilled in the art recognizes that this represents only a partial segment of the total system time.

Time division $TD_n$ begins with the transmission of sync pulse 201 over bus 104. Time division $TD_n$ ends and time division $TD_{n+1}$ begins with the transmission of sync pulse 202 over bus 104. Time division $TD_{n+1}$ ends and time division $TD_{n+2}$ begins with the transmission of sync pulse 203 over bus 104. The sync pulses occur periodically to produce equal time divisions. Any node on the network can be configured to generate the sync pulses. One node is simply designated as the "master node" by assigning the master node the lowest address used in the network, e.g. zero. A node address of zero means messages from the master node have the highest priority. In a preferred embodiment of the present invention, a sync pulse is transmitted over bus 104 every 10.0 milliseconds producing 100 time divisions per second. Those skilled in the art recognize that the time division of a bus system can be tuned depending on the configuration of the system. The 10.0 millisecond time division of the preferred embodiment of the present invention is merely suitable for a particular bus system configuration. Each of messages 205–215 is a message transmitted over bus 104. The format and bit designation of each message is discussed above with respect to FIG. 1 and existing CAN systems. For simplicity each message in FIG. 2 is represented as a single box along timeline 100 rather than showing the more detailed bit by bit representation.

An industrial process control example is provided to further explain the CAN-D system. Node 101 in FIG. 1 includes a mass flow sensor (not shown). Node 101 is configured to produce, during each time division, a message containing the current mass flow rate in grams per second of a fluid flowing through the mass flow sensor. Messages produced by Node A are real-time messages. Message 205 is transmitted by Node 101 during time division $TD_n$, message 209 is transmitted by Node 101 during time division $TD_{n+1}$ and message 213 is transmitted by Node 101 during time division $TD_{n+2}$. Node 102 includes a pressure sensor. Node 102 is configured to produce, during each time division, a message containing the current drop in fluid pressure across the mass flow sensor in pounds per square inch. Messages produced by Node 102 are real-time messages. Message 206 is transmitted by Node 102 during time division $TD_n$, message 210 is transmitted by Node 102 during time division $TD_{n+1}$ and message 214 is transmitted by Node 102 during time division $TD_{n+2}$. The length of the periodic time divisions, the total number of nodes, the number of real-time nodes, and the length of each message are controlled by the system design to ensure that there is enough time during each time division for the necessary communications to occur.

During each time division, the mass flow rate message from node 101 and the pressure drop message from node 102 are read by node 103 and processed by microprocessor 116. Microprocessor 116 combines the data from nodes 101–102 in a known way to produce a value representative of the viscosity of the measured fluid. The deterministic characteristic of the CAN-D system ensures that microprocessor 116 calculates viscosity using mass flow rate data and pressure data generated at or about the same time. In the case of the embodiment where the time divisions are 10.0 milliseconds long, one knows that the mass flow rate data and the pressure data were generated within 10.0 milliseconds of one another.

Viscosity data produced by microprocessor 116 may be used in any of several different ways. For example, viscosity data may be presented on a display (not shown) for viewing by a user. Alternatively, viscosity data may be transmitted over bus 104 to another node on bus 104.

Non-real-time messages are transmitted over bus 104 whenever they are available and priority arbitration permits their transmission. Messages 207, 208, 211, 212 and 215 are additional messages transmitted over bus 104. These messages may be real-time or non-real-time messages.

Non-real-time messages are not necessarily low priority as compared to real-time messages. Using the above example, an additional node (not shown) includes a level sensor producing a level alarm. The level sensor is mounted in a tank into which is flowing the fluid whose viscosity is being measured. When the fluid reaches a certain level in the tank, the level sensor produces a level alarm which is transmitted as a message over bus 104. The level alarm message is not a real-time message but it is assigned a relatively high priority since failure to respond to the level alarm could cause an overflow of the tank.

The CAN-D bus communication system described with respect to FIG. 2 utilizes the message formatting, priority arbitration and error checking described with respect to the CAN protocol and FIG. 1. In addition, CAN-D makes use of commercially available CAN controller and transceiver chips. The sync message used to create a system time in CAN-D imbues the standard CAN protocol with a TDMA-like determinism. Thus, CAN-D is particularly well suited to real-time process control applications or any other application requiring the transmission of real-time data.

The above example where Node 101 is a mass flowmeter and Node 102 is a pressure transducer is an example of the CAN-D system applied to a communications bus 104 between separate instruments in a process plant. One skilled in the art recognizes that the same principles of the CAN-D system are applicable to communications between two nodes of any type.

Figure 3:
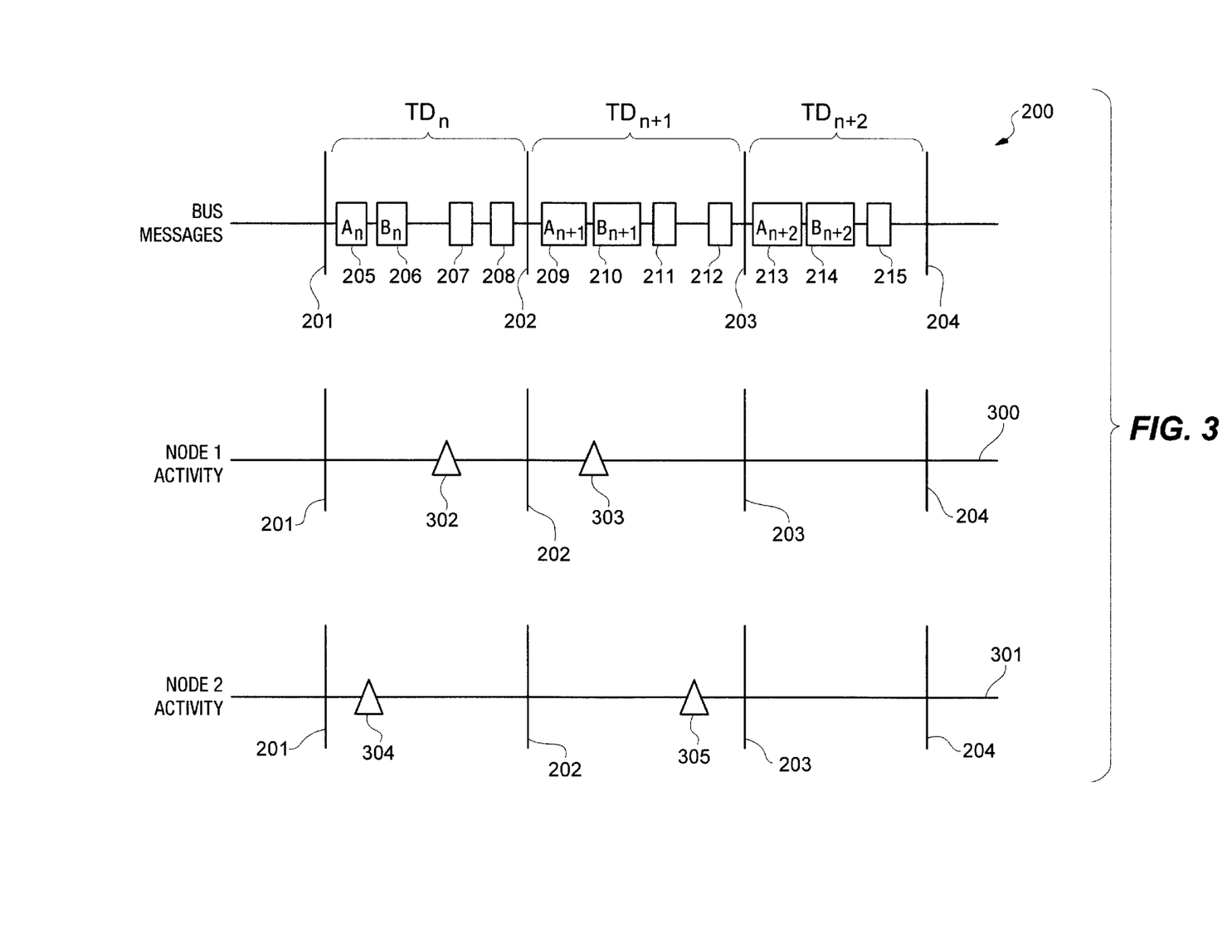
FIG. 3 is a family of timelines illustrating bus message activity as well as node message generation activity according to the present invention.

CAN-D Node Activity—FIG. 3

FIG. 3 is a family of timing diagrams 200, 300 and 301 illustrating, in general, the operation of the present invention including message-generation activity within nodes 101–102. Timeline 200 is identical to timeline 200 of FIG. 2 and indicates bus activity (CAN messages) over bus 104. Timelines 300 and 301 illustrate activity within nodes 101–102, respectively, during each time division. Whereas each box along timeline 200 denotes a CAN message over bus 104, each triangle along timelines 300 and 301 denotes the generation of a message content within nodes 101–102, respectively. FIG. 3 illustrates the timing relationships between the generation of message information within nodes and the transmission of those messages over bus 104.

Timeline 300 represents activity within node 101 of FIG. 1. Likewise, timeline 301 represents activity within node 102 of FIG. 1. For purposes of describing the overall operation of the CAN-D system it is not necessary to explain or understand the processing occurring within each node. It is only necessary to understand that standard CAN formatting and control logic is used at each node to make available messages for transmission over bus 104. For example, a node may be configured such that each sync pulse 201–204 causes the node to initiate the generation of a new message. Alternatively, a node may be configured such that every third synch pulse causes the node to initiate the generation of a new message. It is not necessary that each node, real-time or non-real-time, produce a message during each time division. Also, a single node might produce more than one message during a single time division. Each sync pulse is transmitted to every node on a CAN-D network thereby providing a common sense of time to every node.

CAN message 209 transmitted over bus 104 during time division $TD_{n+1}$ contains message content 302. Message content 302, illustrated on timeline 300, is generated by microprocessor 107 during time division $TD_n$. The generation of message content 302 occurs because node 101 is configured to produce a real-time message during every time division. Alternatively, message content 302 can be generated in response to a "publication demand" requesting the generation of the message. A publication demand instructs a node to prepare a message for transmission over the bus. Publication demands can originate from a node over bus 104 as a system message or can originate within each node. Message content 302 is queued within node 101 until sync pulse 202. Message content 304 is generated within node 102 during time division $TD_n$ and is queued within node 102 until sync pulse 202.

After each sync pulse 201–204 occurs, the messages queued at the nodes are transmitted over bus 104 and new messages are generated and queued at the nodes. For example, after synch pulse 202, the messages queued at nodes 101–102 are transmitted over bus 104 and new messages are generated and queued at nodes 101–102. Message content 302, generated and queued within node 101 during time division $TD_n$, is transmitted over bus 104 as message 209 after sync pulse 202 during time division $TD_{n+1}$. Message content 304, generated and queued within node 102 during time division $TD_n$, is transmitted over bus 104 as message 210 after sync pulse 202 during time division $TDN+_1$. Messages from node 101 have a higher CAN priority than messages from node 102 therefore message 209 is transmitted over bus 104 before message 210 is transmitted over bus 104.

Message content 303 is generated within node 101 and message content 305 is generated within node 102 during time division $TD_{n+1}$. Both messages are queued within their respective nodes until the next sync pulse 203. As occurs during each time division, queued messages are transmitted over bus 104 after each synch pulse. After sync pulse 203, message content 303 is transmitted over bus 104 as message 213 and message content 305 is transmitted over bus 104 as message 214. It does not matter when during a time division a certain message content is generated. It only matters that a real-time message is generated during each time division, if the node is so configured. Standard CAN priority arbitration will ensure the proper order of transmission of messages over bus 104.

Messages 205 and 206 transmitted over bus 104 during time division $TD_n$ were generated during a previous time division $TD_{n-1}$ (not shown). Sync pulse 201 initiated their transmission from nodes 101–102, respectively, over bus 104. The above discussion of FIG. 3 relates to real-time messages transmitted over bus 104. A deterministic communications bus requires the ensured schedulability of the actions and messages in a real-time system. The CAN-D system ensures that real-time data will be communicated during known and predictable time divisions. The deterministic quality of the CAN-D system is not important to the transmission of non-real-time messages. During each time division, the real-time messages are transmitted over the CAN bus before the non-real-time messages. This is guaranteed by assigning higher priority CAN addresses to the real-time nodes than are assigned to the non-real-time nodes. After the transmission of all real-time messages, the time remaining in a given time division is available for the transmission of non-real-time messages. If any non-real-time messages are not sent because the time division ends, the remaining non-real-time messages are held over for transmission during the next time division. During the next time division, transmission of the held-over non-real-time messages again must wait until the real-time messages are sent.

Figure 4:
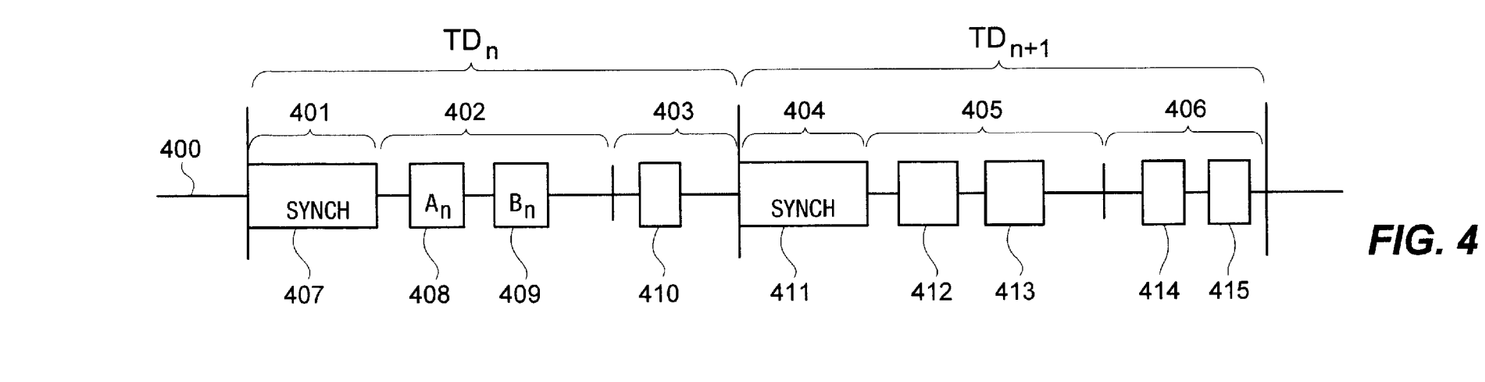
FIG. 4 is a timeline illustrating a further embodiment of the communications system of the present invention.

CAN-D Segmented Time Divisions—FIG. 4

Various implementations of CAN-D are possible that all result in a deterministic, CAN communications environment. FIG. 4 illustrates a timing diagram of one embodiment of the present invention where each time division is segmented into three segments and the sync signal performs multiple functions in addition to signaling the start of a new time division.

Timeline 400 illustrates message activity over bus 104 during two time divisions. Time division $TD_n$, which is representative of each time segment, is broken into three segments 401–403. Segment 401 is the "sync segment", segment 402 is the "real-time segment" and segment 403 is the "non-real-time segment". Time division $TD_n$ is initiated by the transmission of sync message 407. Sync message 407 is a high priority system message that is transmitted for the duration of sync period 401. Sync message 407 is, like the sync pulse of FIGS. 2–3, a CAN message having the highest priority. Transmission of sync message 407 accomplishes several objectives. One objective accomplished by the transmission of sync message 407 is the initiation of a new time division. Another objective accomplished by the transmission of sync message 407 is that the transmission of all other messages are held off the bus due to the high priority of the sync message. A further effect of the sync message is as a signal or interrupt to each node to build its real-time messages. Messages are prepared at each node during synch period 401 and their transmission over bus 104 awaits standard CAN arbitration during segments 402–403. The duration of the sync message is the same length of time during each time division. In one embodiment using 10.0 millisecond time divisions, for example, the sync message lasts for 1 millisecond.

During segment 401, which corresponds to transmission of sync message 407, the various real-time producing nodes generate and queue their respective real-time messages. Segment 402 of $TD_n$ begins when sync message 407 is complete. Standard CAN priority arbitration then automatically sorts the queued real-time messages and allows them to be sent out over bus 104 during segment 402. The real-time and non-real-time messages are prioritized such that all the real-time messages, but only the real-time messages, are transmitted during the real-time segment of each time division.

Segment 403 of $TD_n$ begins when all the real-time messages have been transmitted over bus 104. The number of real-time nodes connected to bus 104 must be selected such that each one can transmit a message during each real-time segment and still leave a long enough non-real-time segment for a sufficient amount of non-real-time messages. Any non-real-time messages for which there is not enough time to transmit during a given time division are held off the bus until the non-real-time segment of the next time division.

Time division $TD_{n+1}$ is segmented into sync segment 404, real-time segment 405 and non-real-time segment 406. CAN messages are formed and transmitted during time division $TD_{n+1}$, and other time divisions (not shown), as described with respect to time division $TD_n$.

Figure 5:
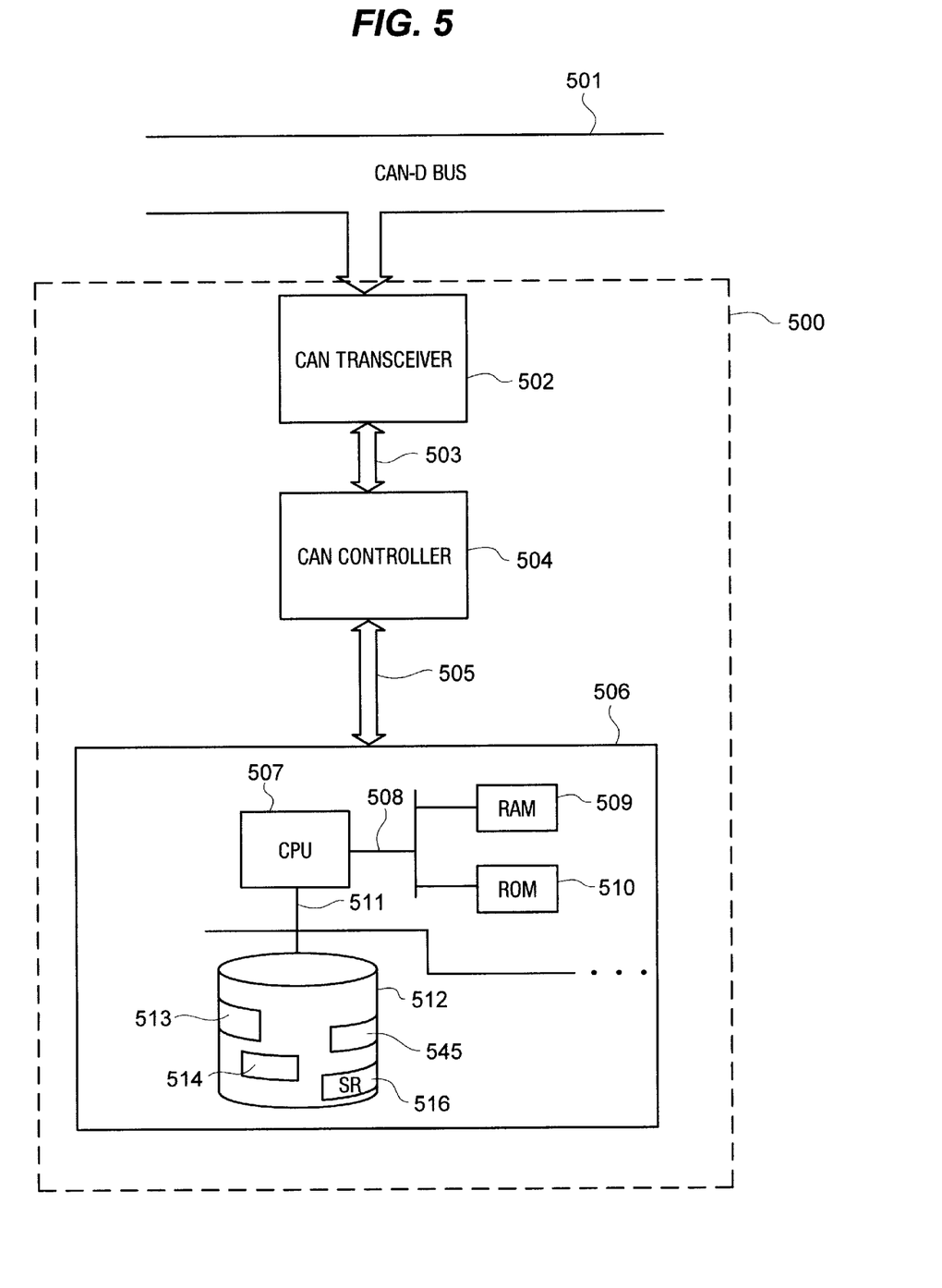
FIG. 5 depicts a single node in greater detail.

Intra-Nodal Communications—FIG. 5

The communications protocol of the present invention is also applicable to communications between functional blocks within a single node. FIG. 5 illustrates a node 500 connected to a CAN-D bus 501. Node 500 includes the major components discussed with respect to FIGS. 1–4 namely, CAN transceiver 502, CAN controller 504 and microprocessor 506. CAN transceiver 502 controls the physical interface between node 500 and CAN-D bus 501. CAN transceiver 502 communicates over path 503 to CAN controller 504 which implements the standard CAN protocol features such as priority arbitration and error checking. CAN controller 504 communicates over path 505 to microprocessor 506. Microprocessor 506 is shown in greater detail than the microprocessors of FIG. 1. Programmed instructions for the operations performed by node 500 are executable on Central Processing Unit ("CPU") 507. CPU 507 stores and/or retrieves the programmed instructions and/or data from memory devices that include, but are not limited to, Random Access Memory (RAM) 509 and Read Only Memory (ROM) 510 by way of memory bus 508. Another accessible memory device includes non-volatile memory device 512 by way of local bus 511. Programmed instructions for implementing multiple applications 513–515 are stored on non-volatile memory device 512. Software router 516 directs the intra-nodal operation of node 500, as described below. Various input and output devices (not shown) are connected to local bus 511 to allow a user to interact with the functionality of node 500.

Software router 516 is an application executed by CPU 507. Software router 516 is programmed by a user to direct the operation of other applications or functional blocks within node 500. For example, in one embodiment of node 500, a measurement of viscosity is delivered by node 500 to CAN-D bus 501 every other time division. Software router 516, as executed by CPU 507, responds to each sync signal to direct operations by applications 513–515. In the current example, application 513 produces a mass flow rate datum, application 514 produces a differential pressure datum and application 515 produces a viscosity datum. Application 515 uses the data from applications 513–514 to produce the viscosity datum. Applications 513–515 produce their respective output when directed to do so by software router 516. Software router 516 directs which of applications 513–515, if any, should produce output subsequent to each sync signal. For the current example, software router 516 is programmed to 1) request application 513 (mass flow rate) produce output during each time division, 2) request application 514 (differential pressure) produce output during alternating time divisions, and 3) request application 515 (viscosity) produce output during alternating time divisions (the time divisions when application 514 is not producing output). In response to a first sync signal, software router 516 instructs application 513 and 514 to produce output. During a first time division (initiated by the first sync signal), applications 513 and 514 produce output messages to software router 516. In response to a second sync signal, software router 516 directs the output messages from applications 513–514 (generated during the previous time division) to application 515 and directs the mass flow rate output message from application 513 to CAN-D bus 501. Other nodes (not shown) on CAN-D bus 501 utilize the mass flow rate output from node 500. Software router 516 also requests application 515 to produce a viscosity output message. Application 515 processes the mass flow rate and differential pressure messages produced by applications 513 and 514 (generated during the previous time division), respectively, to produce a viscosity message which is sent to software router 516. During a third time division (after a third sync signal), software router 516 directs the viscosity message (received from application 515 during the previous time division) to CAN-D bus 501 for consumption by other nodes (not shown).

The CAN-D protocol and software router allow for flexible implementation and amendment of an overall system architecture. For example, it may be more efficient to have the mass flow rate information generated in a node different and separate from the viscosity-producing node. Application 513 is thus moved from node 500 to a different node (not shown) on CAN-D bus 501. No changes need be made to application 513. It simply resides on another node where that node's software router instructs application 513 when to produce output.

A "software router" is not required according to the communications protocol of the present invention. For example, each functional block within a node could instead be configured to produce the appropriate message(s) during each time division and send the message(s) so they are received during an appropriate time division. The software router simply serves as a convenient scheduling tool which, among other things, queues a message received during one time division and sends the queued message to the appropriate functional block during the next time division. This ensures that messages are communicated in a fashion that preserves the deterministic quality of the communications protocol of the present invention.

In a further embodiment of the present invention, the intra-nodal communication described with respect to FIG. 5 is utilized where a node does not exchange data with a CAN-D bus or any other type of bus. With reference to FIG. 5, only microprocessor 506 is relevant to this embodiment and the remaining elements, e.g. CAN transceiver 502, CAN controller 504 and CAN-D bus 501, either do not exist or are not utilized. Rather than receiving a sync pulse from a master node on a bus, a timer is implemented utilizing operating system methods to produce a periodic event having the equivalent effect as a sync pulse. An operating system is a set of services which provide a means by which 1 or more functional blocks can share a hardware platform. Each timer event marks the start of a new time division during which software router 516 sends request messages to functional blocks 513–515. Functional blocks 513–515 receive the request messages from software router 516 and deliver the requested data back to software router 516. In this embodiment, software router 516 takes advantage of a message queue provided by the operating system to queue the messages from functional blocks 513–515 until the next time division. At the start of the next time division, software router 516 distributes the queued messages to the appropriate ones of functional blocks 513–515 and sends the next set of request messages to functional blocks 513–515. Messages are prioritized in this embodiment according to operating system methods by assigning a high priority to real-time messages and lower priority to non-real-time messages. This embodiment allows for deterministic, real-time processing within a single node even when the node is not connected to a CAN-D bus. Of course, a node operating in this fashion is easily integrated into a CAN-D bus environment, if appropriate.

Figure 6:
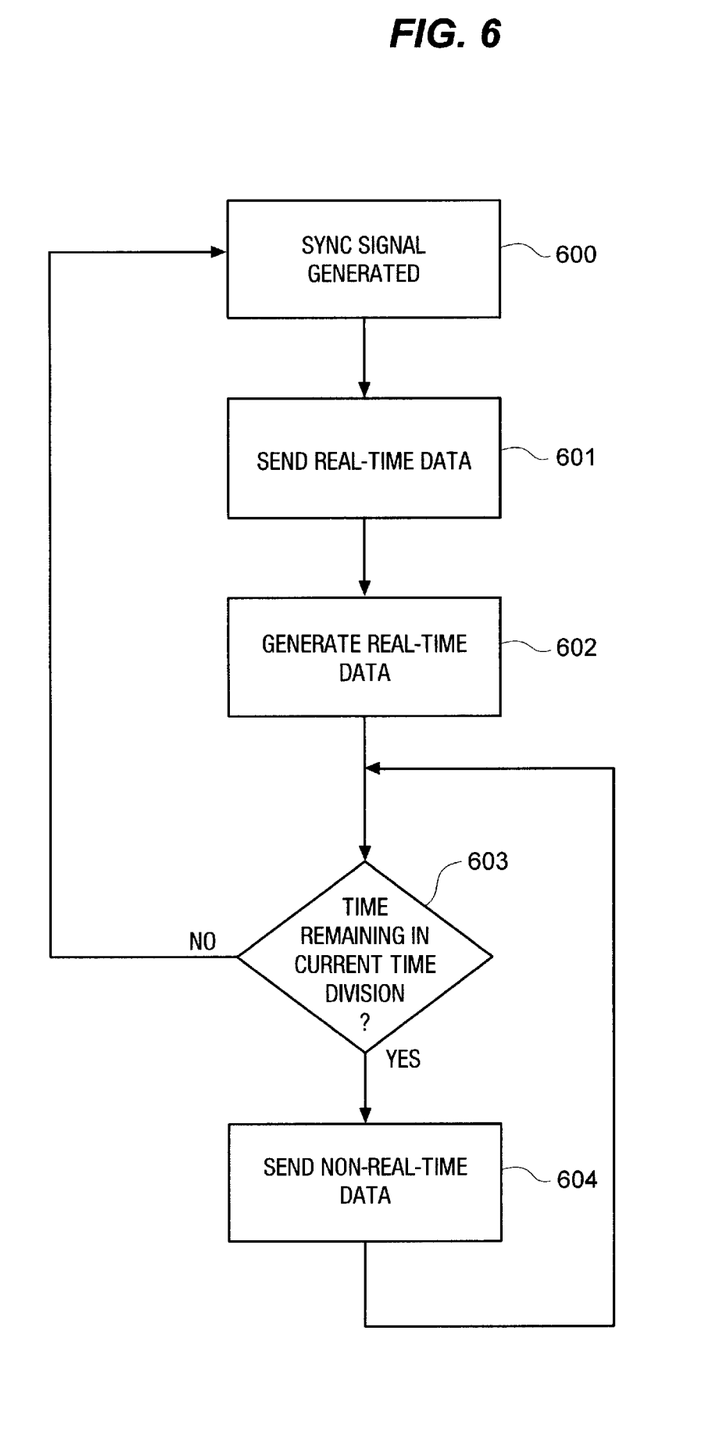
FIG. 6 is a flowchart illustrating the processing steps related to communication of messages relative to a sync signal.

Nodal Processing Steps—FIG. 6

FIG. 6 depicts the steps which occur at each node in response to a sync signal. FIG. 6 is used to describe the operation of the embodiment including multiple nodes on a CAN-D bus as well as the embodiment of a single node not connected to a CAN-D bus but communicating among multiple functional blocks according to a CAN-D-based protocol. During step 600 the sync signal is received at a node. As noted above, the sync signal is transmitted from a master node to the bus or, alternatively, may be generated as a local timer event in the case where a node operates independently from a bus. A common sense of time among all the nodes of the bus and/or all the functional blocks within a node is achieved by each node resetting a new time division with each sync signal. A new time division begins with each sync signal and processing continues to step 601.

During step 601 any real-time messages that were queued during the previous time division are appropriately communicated. In the case of multiple nodes connected to a CAN-D bus, the real-time messages are put on the CAN-D bus. In the case of a signal node, the real-time messages are distributed to the appropriate functional blocks. Processing then continues to step 602.

During step 602 real-time data for the current time division is generated. Depending on the configuration of the node (and/or of the software router in the node) some real-time data may be sent during the time division in which the real-time data is generated. Non-real-time data is typically sent whenever there is time available during a time division. This may be after all the real-time data has been sent or during a period when real-time data is being generated and the bus is idle. Processing continues from step 602 to decision block 603 where, if more time is available in the current time division, processing is passed to step 604. During step 604 non-real-time data is sent. Real-time data may also be sent during this step. Steps 603–604 are repeated until another sync signal is generated indicating the start of a new time division.

Processing steps 600–604 operate to transmit real-time data first during each time division. The remaining time is used for the transmission of non-real-time data.

SUMMARY

The serial bus communication system of the present invention combines the simplicity and availability of low-cost CAN components and protocol with the attribute of determinism. Thus the deterministic-CAN protocol of the present invention is well-suited for the communication of realtime data as compared to prior CAN implementations.

What is claimed is:

1. A method for reducing the number of messages needed to transfer data in a deterministic manner between a plurality of nodes communicatively connected by a bus using the Controller Area Network ("CAN") serial communications protocol, said method including the steps of:

1) broadcasting a synchronization message having a high priority over said bus to said plurality of nodes wherein said synchronization message includes a synchronization signal that indicates a common time division for transmitting messages that includes sufficient time for transmitting a plurality of high priority messages and at least one low priority message;

2) performing arbitration between said plurality of nodes to transmit a one of said plurality of high priority messages from one of said plurality of nodes;

3) transmitting said one of said plurality of high priority messages from said one of said plurality of nodes responsive to one of said plurality of nodes winning said arbitration;

4) repeating steps 2 and 3 responsive to at least one of said high priority messages remains to be transmitted;

5) determining whether said common time division has time remaining responsive to none of said plurality of high priority messages remain to be transmitted;

6) performing arbitration between said plurality of nodes to transmit said at least one low priority messages responsive to said common time division having time remaining;

7) transmitting one of said at least one low priority messages from one of said plurality of nodes that wins said arbitration;

8) determining whether low priority messages remain to be transmitted; and

9) Repeating steps 5–8 responsive to low priority messages remaining to be transmitted and time remaining in said common time division.

2. The method of claim 1 wherein said step of determining whether said common time division has time remaining includes the step of:

broadcasting a second synchronization message of high priority that includes a synchronization signal that indicates the completion of said common time division and a beginning of a second time division.

3. The method of claim 2 further including the step of:

halting transmission of said at least one low priority messages responsive to a reception of said second synchronization message.

4. The method of claim 2 further including the step of:

storing each of the remaining said at least low priority messages in each said node that generated said each of the remaining said low priority messages for transmission during a subsequent common time division.

5. The method of claim 1 further including the step of:

generating at least one of said plurality of high priority messages in at least one of said plurality of nodes responsive to said reception of said first synchronization message.

6. The method of claim 5 further comprising the step of:

storing each of said at least one of said high priority messages in a memory in said at least one of said plurality of nodes for transmission in a subsequent common time division.

7. The method of claim 6 wherein said step of determining whether said common time division has time remaining includes the step of:

broadcasting a second synchronization message having a high priority over said bus to said plurality of nodes to indicate an end of said common time division and a beginning of a second common time division.

8. The method of claim 7 further including the steps of:

repeating steps 2–9 responsive to receiving said second synchronization message.

9. The method of claim 8 further including the step of:

transmitting at least one of said low priority messages responsive to completion of said transmission of said at least one high priority messages stored in memories of said plurality of nodes.

10. The method of claim 9 wherein said step of generating said at least one high priority message includes the step of:

receiving data from instrumentation in a node in a CAN controller in said node; and inserting said data into a CAN message with said CAN controller responsive to a reception of said data.

11. The method of claim 10 wherein said instrumentation in one of said plurality of nodes is a mass flow rate sensor and said data is mass flow rate of a material.

12. The method of claim 10 wherein the instrumentation in one of said nodes includes a pressure sensor and said data is fluid pressure across a mass flow sensor.

13. The method of claim 10 wherein one of said plurality of nodes includes instrumentation that calculates viscosity of a fluid.

14. The method of claim 1 further including the step of:

setting a clock in an operating system in each said node based upon said first synchronization message responsive to a reception of said first synchronization message.

15. The method of claim 1 wherein said plurality of high priority messages include real-time messages.

16. The method of claim 1 wherein said low priority messages are non-real time messages.

17. The method of claim 1 further including step of: generating said first synchronization message in a master node.

18. An apparatus for reducing the number of messages needed to provide deterministic communication between multiple nodes connected by a communications bus using the Controller Area Network ("CAN") serial communications protocol, said apparatus comprising:

a one of said plurality of nodes that is a master node having a CAN controller that generates a synchronization message of high priority and transmits said synchronization message over said bus to start a common time division;

means in CAN controllers of each remaining node for receiving said synchronization message;

means in said CAN controllers of said multiple nodes for arbitrating for control of a bus and transmitting high priority messages during said common time division in response to a reception of said synchronization message;

means in said CAN controllers of said multiple nodes for determining all said high priority messages have been transmitted; and means in said CAN controllers of said multiple nodes for arbitrating to transmit low priority messages during a remainder of said common time division responsive to a determination that all of said high priority messages have been transmitted.

19. The apparatus of claim 18 wherein said master node generates and transmits a second synchronization message to end said common time division and begin a second common time division.

20. The apparatus of claim 18 further comprising:

means in said CAN controllers of said multiple nodes for translating messages generated within said nodes to a format consistent with said CAN protocol.

21. The apparatus of claim 20 wherein said means for translating includes:

physical interface means for interfacing with said bus; and

CAN protocol means for translating messages generated within said nodes to a format consistent with said CAN protocol.

22. The apparatus of claim 18 wherein said master node includes:

timing means for determining each common time division.

23. The apparatus of claim 18 wherein each said node further comprises:

means for generating a CAN message containing data.

* * * * *

UNITED STATES PATENT AND TRADEMARK OFFICE
CERTIFICATE OF CORRECTION

PATENT NO : 6,111,888
DATED : August 29, 2000
INVENTOR(S) : Thomas C. Green, Paul J. Hays, Allan L. Samson, Jeffrey S. Walker, and Michael J. Zolock It is certified that error appears in the above-identified patent and that said Letters Patent are hereby corrected as shown below:

Col. 9, line 60
replace "division TDN+$_1$. Messages from node 101 have a higher"
with --division TD$_{n+1}$. Messages from node 101 have a higher--.

Col. 14, line 4
replace "realtime data as compared to prior CAN implementations."
with --real-time data as compared to prior CAN implementations.--.

Col. 14, line 53
replace "The method of claim 2 further including the step of:"
with --The method of claim 3 further including the step of:--.

Signed and Sealed this

Fifteenth Day of May, 2001

NICHOLAS P. GODICI

Attest:

Attesting Officer

Acting Director of the United States Patent and Trademark Office

UNITED STATES PATENT AND TRADEMARK OFFICE
CERTIFICATE OF CORRECTION

PATENT NO. : 6,111,888
DATED : August 29, 2000
INVENTOR(S) : Thomas C. Green et al.

It is certified that error appears in the above-identified patent and that said Letters Patent is hereby corrected as shown below:

Column 9,
Line 60, replace "division TDN+$_1$. Messages from node 101 have a higher" with -- division TD$_{n+1}$. Messages from node 101 have a higher --.

Column 14,
Line 4, replace "realtime data as compared to prior CAN implementations." with -- real-time data as compared to prior CAN implementations. --
Line 53, replace "The method of claim 2 further including the step of:" with -- The method of claim 3 further including the step of: --.

Signed and Sealed this

Twenty-first Day of September, 2004

JON W. DUDAS
*Director of the United States Patent and Trademark Office*